May 1, 1962 KOJI OHYAGI 3,031,803
GRINDER OR LIKE MACHINE TOOL
Filed Feb. 18, 1959 3 Sheets-Sheet 1

INVENTOR.
KOJI OHYAGI
BY

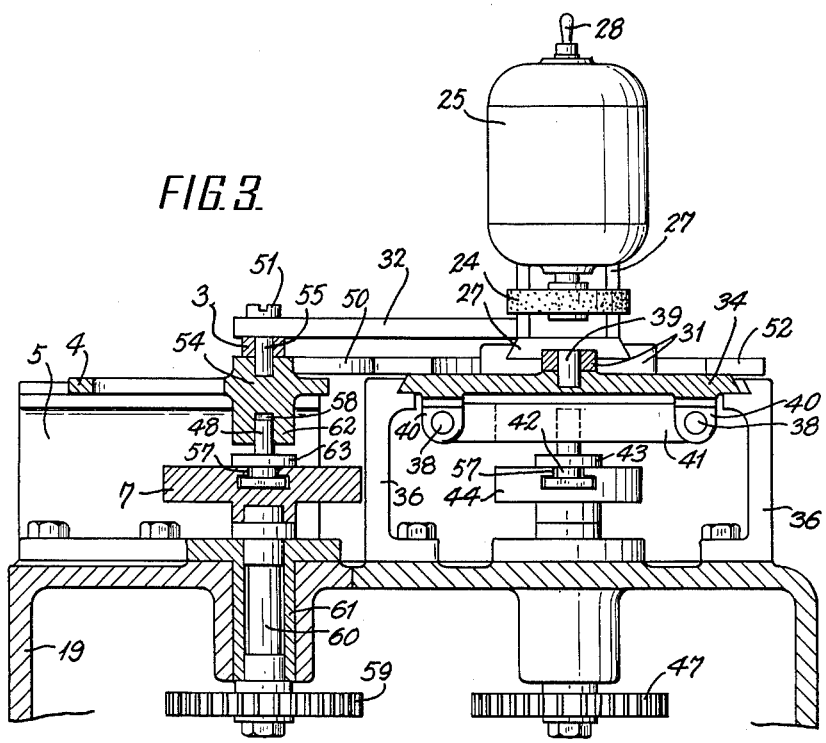
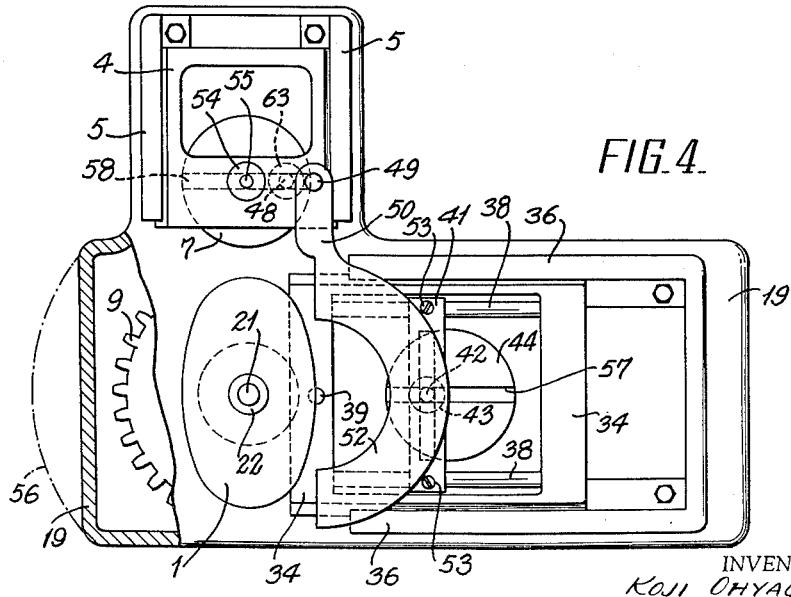

May 1, 1962  KOJI OHYAGI  3,031,803
GRINDER OR LIKE MACHINE TOOL
Filed Feb. 18, 1959  3 Sheets-Sheet 3

INVENTOR.
KOJI OHYAGI
BY Leon M. Strauss
AGT

United States Patent Office 3,031,803
Patented May 1, 1962

3,031,803
GRINDER OR LIKE MACHINE TOOL
Koji Ohyagi, 236 Shimohirama, Kawasaki-shi,
Kanagawa-ken, Japan
Filed Feb. 18, 1959, Ser. No. 794,182
Claims priority, application Japan Mar. 20, 1958
18 Claims. (Cl. 51—32)

The present invention relates to a machine tool with a rotary tool, such as, a grinder, milling machine or the like.

More particularly, this invention concerns a machine tool with a rotary tool which is adapted to cut or grind a rotating work piece of a special contour, such as a deviated circle, an approximate ellipse, an approximate regular triangle, an approximate square or other approximate regular polygon, which is of a closed curve represented by a polar equation $\rho = r + K(1 - \cos n\theta)$, where $\rho$ denotes length of existing radius vector, $r$ is the original length of radius vector, $K$ amplitude of a cosine curve and $n$ an integer.

The primary object of this invention is to provide means conducive to a very efficient construction of a machine tool whereby working of a work piece of such a special contour as mentioned above can be effected simply and accurately.

Another object of this invention is to provide a machine tool of this kind whereby a rotor of a pump, blower, flow meter or the like, or a spline shaft having an outer circumference of such a special contour as mentioned above or a casing of a pump etc. having an inner circumference of the aforementioned special contour can be worked in a highly economical and simplified manner.

Still another object of this invention is to provide means facilitating the creation of a machine tool of this kind of a relatively simple construction and high reliability.

According to the present invention, besides the shaft of the work piece the machine tool has one or two shafts adapted to rotate with a velocity $n$ times higher than that of the work piece. In this machine the rotary tool is moved relatively to the work piece in association with rotation of the said one or two shafts in such a manner that while any existing osculating line of the tool with the work piece generates the circumference of the work piece of a contour of a closed curve $$\rho = r + K(1 - \cos n\theta)$$

the center axis of the tool swings circularly about said osculating line, whereby the center axis of the tool is adapted to lie always in a plane normal to a tangent plane including said osculating line and common to the work piece and the tool.

The foregoing and other objects accomplished will readily be understood from the following description with reference to the accompanying drawings.

Figure 1:
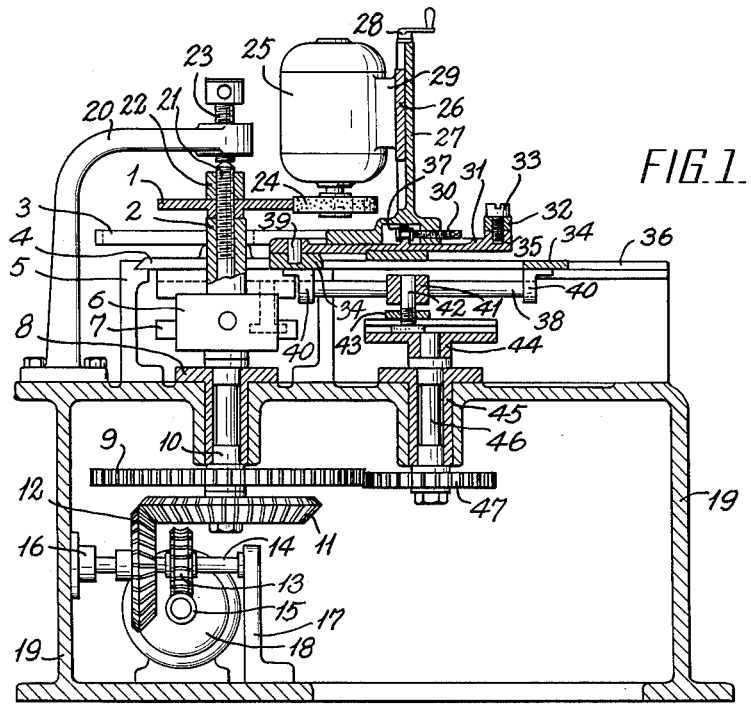
Figure 2:
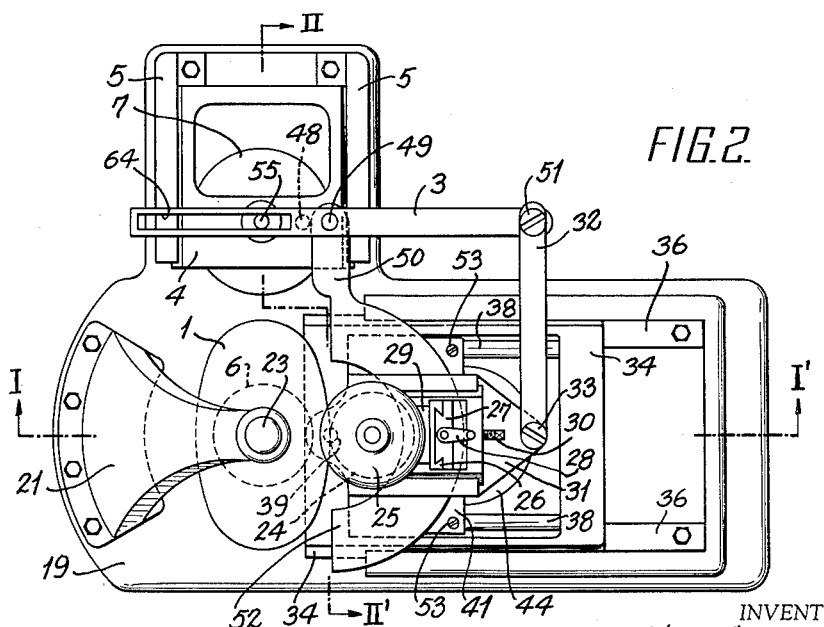
Figure 5:
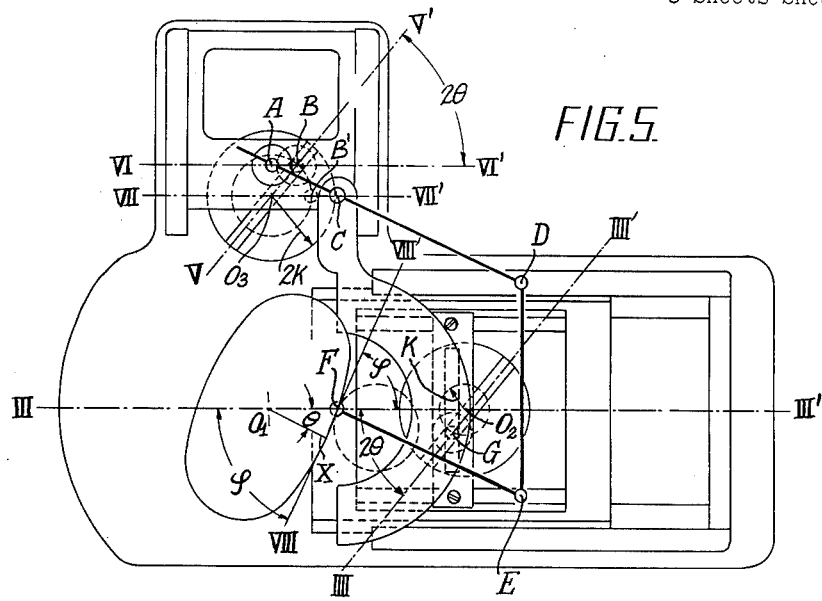
Figure 6:
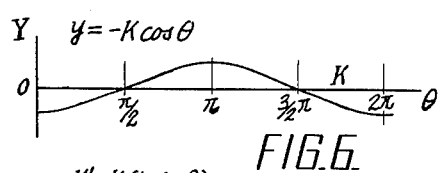
Figure 7:
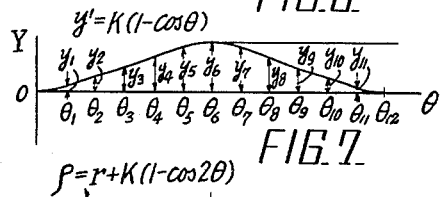
Figure 8:
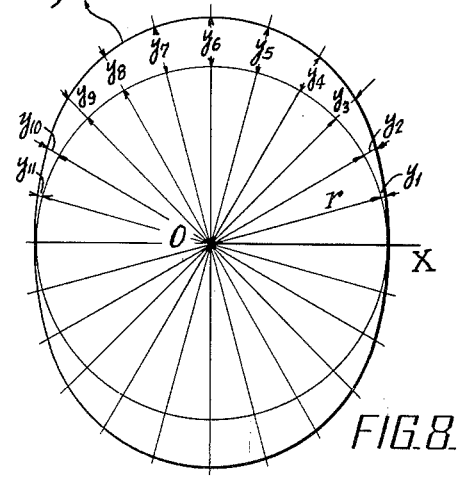

In the accompanying drawings, in which a grinder is shown as one embodiment of this invention, FIG. 1 is a vertical sectional front view of the grinder taken along line I—I' of FIG. 2 and seen in the direction of the arrows, of FIG. 2, FIG. 2 is a plan view of the grinder, FIG. 3 is a vertical sectional partial side view of the grinder taken along line II—II' of FIG. 2 and seen in the direction of the arrows in FIG. 2, FIG. 4 is a plan view of the grinder, partly in section, with some parts removed, FIG. 5 is a schematic plan view of the same, with some parts removed, for explaining functions of the grinder, FIGS. 6, 7 and 8 show explanatory diagrams for a closed curve represented by a polar equation $$\rho = r + K(1 - \cos 2\theta)$$

and

Figure 9:
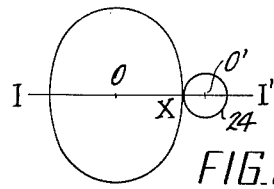
Figure 10:
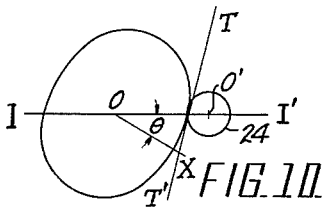
Figure 11:
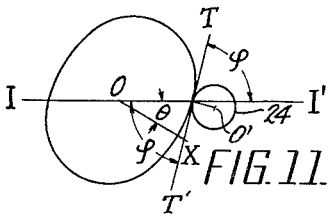

FIGS. 9, 10 and 11 show explanatory diagrams for relative movement of the grinder wheel to the work piece.

Referring to FIGS. 1 and 3, three bearings 8, 45 and 61 are arranged in the upper plate of a box-shaped bed 19 of the machine and shafts 10, 46 and 60 (see FIG. 3) are fitted into said bearings 8, 45 and 61, respectively. These shafts are to be driven by an electric motor 18, as explained later.

Spur gears 9, and 47, 59 are keyed to the lower parts of these shafts, respectively, and meshing together have a continued ratio of tooth numbers of 2:1:1. A securing base 6 for a piece to be ground, that is, a work chuck, and eccentric pin clamping circular discs 44, 7 are fixed to the upper parts of the shafts 10, 46 and 60, respectively. Two beds 36 and 5 are secured onto the upper plate of the box-shaped bed 19. The side frames of the bed 36 are situated on the upper plate of the bed 19 symmetrically to a plane (hereinafter called the first plane) including the center axes of the shafts 10 and 46, while the side frames of the other bed 5 are situated also symmetrically to a plane (hereinafter called the second plane) including the center axes of the shafts 10 and 60. These first and second planes intersect perpendicularly on the center axis of the shaft 10, so that the longitudinal directions of the beds 36 and 5 are perpendicular to each other.

The eccentric pin clamping circular discs 44 and 7 of similar shapes are provided in their upper portions with eccentric pin guiding grooves 57, 58 of an inverted T shape cross section (FIG. 4) into which the lower parts of a circular disc shape eccentric pins 42 and 48 are so inserted as to be slidable therein. These pins can be fixed to their respective clamping discs by screwing fast the eccentric pin clamping nuts 43 and 63, respectively, in positions suitably distant from the center axes of the shafts 46 and 60, respectively. In FIG. 4 the distance between the center axis of the eccentric pin 42 and that of the shaft 46 corresponds to the value of K, while the distance between the center axis of the pin 48 and that of the shaft 60 corresponds to the value of 2K.

Furthermore, the construction of a slide frame 34 which can slide on the bed 36 through the eccentric pin 42 will be explained. This frame 34 consisting of a hollow rectangular frame has two rods 38 fixed to its lower side by four securing metal pieces 40 and arranged in the longitudinal direction of the bed 36, as shown in FIG. 1. As shown in FIG. 4, a main line pointing piece 41 with an oblong rectangular slot is so mounted onto the rods 38 by eyelet pieces fixed thereto as to be able to slide along the rods 38. The eccentric pin 42 is inserted into the rectangular slot of the pointing piece 41, so that when the clamping circular disc 44 rotates, the pin 42 revolves about the center axis of the disc 44, with the result that the pointing piece 41 moves rectilinearly and reciprocatingly along the rods 38. When clamping set screws 53 are so screwed fast to the rods 38 as to fix the pieces 41 to the rods 38, the pieces 41 integral with the slide frame 34 can move on the bed 36 rectilinearly and reciprocatingly.

As shown in FIGS. 1 and 4, the slide frame 34 is provided at its left end with a directing pin 39 which is so located in the frame 34 that its center axis lies always in the first plane.

A segmental guide plate 52 for a grinding post arranged above the slide frame 34 is provided at its one end with a projection 50 into which a perpendicular indicating pin 49 is so disposed vertically that a plane including its center axis and the center axis of the shaft 60 lies parallel to the first plane mentioned above. On the other hand, the indicating pin 49 and the directing pin 39 are positioned relatively to each other so that their center axes lie always in a plane parallel to the second plane. That is, vertical projections of the center axes of the pins 49, 39, and the shafts 10 and 60 in a horizontal plane form always four vertices of a rectangle.

Now, with reference to the grinding post assembly, as shown in FIGS. 1 and 2, the grinding post assembly consists of a directing base 31, an angular guide frame 27, a vertical slide plate 26, a motor base 29, an electric motor 25, a grinding tool 24, an adjusting handle 28 for vertical movement, a threaded rod 30 for adjusting the extreme position of the tool, a steering screw 33, a steering rod 32 etc. As shown in FIG. 1 the lower face of the directing base 31 is so stepped segmentally as to be fitted closely to the upper face of the guide plate 52, whereby when the directing pin 39 is inserted into a cylindrical hole in the left end of the directing base 31, the base 31 can revolve about the center axes of the pin 39 while sliding on and along the guide plate 52.

As shown in FIG. 3 the directing base 31 is provided in its upper portion with a dovetail groove into which is fitted a dovetail projection on the lower side of the horizontal part of the angular guide frame 27, so that the frame 27 can slide on the base 31. Namely, screwing in or out of the threaded rod 30 which is, as shown in FIG. 1, in a mere rotatable engagement with a projecting piece 37 of the directing base 31 effects a sliding movement of the frame 27 on the base 31 perpendicular to the directing pins 39, resulting in compensation of an eventual wear of the tool or grindstone 24. The vertical slide plate 26 which is in a dovetail engagement with the guide frame 27 can slide vertically on the frame 27 upon rotation of the handle 28, whereby the motor 25 fixed through the base 29 to the plate 26 can be moved vertically in order to put the tool 24 in an adequate or selected position.

As all the mechanisms in connection with movement of the toothed wheel 47 have been explained in the foregoing, the mechanisms in connection with movement of the toothed wheel 59 will now be explained.

As shown in FIGS. 2 and 3 a tangent indicating frame 4 which can slide on and along the bed 5 through the eccentric pin 48 is provided on its lower side with a base indicating groove 58 of a rectangular section formed by two ledges 62 parallel to each other and perpendicular to the second plane, which groove is made so wide as to receive the top end portion of the eccentric pin 48 to permit the pin 48 to slide therein. A base indicating pin 55 is vertically fixed to the central part of a cylindrical projection 54 on the upper side of the frame 4, and the center axis of said pin 55 is situated in a line with the center axis of the shaft 60. Thus, when the circular disc 7 rotates to put the tangent indicating frame 4 in a reciprocating movement on the bed 5, the center axis of the base indicating pin 55 is put simultaneously also in a reciprocating movement in the second plane.

Referring to FIGS. 2 and 4, the perpendicular indicating pin 49 is inserted into a cylindrical hole in a directing lever 3 into whose oblong rectangular slot 64 is also inserted the base indicating pin 55, so that in FIG. 2 the longitudinal center axis of the directing lever 3 lies parallel to the first plane. As shown in FIG. 2 the right end of the directing lever 3 is pivoted by a pin 51 to one end of the steering rod 32.

As shown in FIG. 1, the other end of the steering rod 32 is jointed by the steering screw 33 to the cylindrical projection 35 situated at the vertex part of a triangular part of the directing base 31. The distance between the center axes of the cylindrical holes at the both ends of the steering rod 32 into which the pins 51 and the screw 33 are fitted is made equal to the distance between the center axes of the perpendicular indicating pin 49 and the directing pin 39, while the central distance between the pin 49 and the pin 51 in the plane of the directing lever 3 is made equal to the distance between the center axes of the directing pin 39 and the screw 33. Thus the center axes of the above mentioned pins 49, 51, screw 33 and pin 39 are so situated that their vertical projections in a horizontal plane lie always at the four vertices of a rectangle or a parallelogram.

With reference to a transmission means shown in the drawings, particularly to FIG. 1, a bevel wheel 11 fixed to the shaft 10 meshes with a bevel wheel 12 keyed to a shaft 14 supported by bearing supports 16 and 17. A worm wheel 13 fixed to the shaft 14 meshes with a worm 15 keyed to the shaft of an electric motor 18. To the shaft 10 is fixed chuck 6 to which is fixed in turn a rod 21 having the threaded free end onto which a sleeve 2 is mounted. Between sleeve 2 and a nut 22 screwed on the threaded end of the rod 21 there is clamped the work piece 1 to be ground. Centering of the piece 1 is effected by fitting the tip end of the rod 21 into a central recess in the lower end of a set screw 23 screwed in the bracket 20 of the tail stock fixed to the bed 19.

Next, explanations will be given with reference to a closed curve denoted by an equation $\rho = r + K(1 - \cos 2\theta)$.

Assuming $y$ denotes an ordinate, while $\theta$ an abscissa, the diagram shown in FIG. 6 shows a cosine curve denoted by $y = -K \cos \theta$, where $K$ is an amplitude. The diagram in FIG. 7 shows also a cosine curve denoted by $y' = y + K$ which is made by displacing parallelly the original abscissa by a distance $K$. This curve is expressed in other terms as $y' = K(1 - \cos \theta)$. The distance of the abscissa between the points $\theta = o$ and $\theta = 2\pi$ is divided, for example, into twelve equal parts as shown by points $\theta_1$, $\theta_2$, $\theta_3 \ldots \theta_{12}$ and values of $y'$ corresponding to these values of $\theta_n$ are denoted by $y_1, y_2, y_3 \ldots y_{11}$. As shown in FIG. 8 a circumference of a circle of a radius $r$ is divided into twenty-four equal parts and the radii of the circle passing through the equidivisional points are elongated till they have their proper length plus lengths $y_1, y_2, y_3 \ldots y_{11}$ in an angular range of 180°. By plotting the extremities of the thus elongated radii one can obtain a closed curve mentioned above. Namely, because values of $y'$ of a cosine curve ranging from $\theta = 0$ to $\theta = 2\pi$ are added to the radius $r$ of a circle within an angular range of 180°, $\pi$ radian, the polar equation of this closed curve becomes $\rho = r + K(1 - \cos 2\theta)$.

It is natural that this equation can be expressed in a general form of $\rho = r + K(1 - \cos \theta)$ and, if $n$ is 1 the curve represented by this equation is a somewhat deviated circle and if $n$ is 2, the curve becomes approximately elliptic as shown in FIG. 8. If $n$ is 3, 4, 5 and so on, the curve represented by this equation is approximately triangular, quatrate, pentagonal and so on. Thus, it is evident that the polar equation $\rho = r + K(1 \cos n\theta)$ represents any closed curve of an approximately polygonal regular contour.

Referring to FIGS. 4 and 5 the reason why the center axis of the directing pin 39 can describe a locus of a contour of the above mentioned closed curve in the plane of the piece 1 will be explained.

As mentioned above, the distance between the center axis of the eccentric pin 42 and that of the shaft 46 corresponds to the value of $K$ and in FIG. 4 the center axis of the pin 42 lies in the first plane. Under these conditions the set screws 53 are loosened to permit the slide frame 34 to slide on the bed 36 till the center axis of the directing pin 39 is made to lie at a distance $r$ from the center axis of the shaft 10, and then the set screws 53 are screwed again fast, so that the main line pointing piece 41 is fixed to the frame 34. When the electric motor 18 rotates, then the toothed wheels 9 and 47, consequently, shafts 10 and 46, are driven to rotate through a gearing consisting of the worm, worm wheel, and bevel wheels shown in FIG. 1.

As shown in FIG. 5, when the shaft 10 rotates by an angle $\theta$, the piece 1 also rotates clockwise by an agle $\theta$ from the position shown in FIG. 4. Consequently, the shaft 46 of the toothed wheel 47 rotates counter-clockwise by an angle $2\theta$. Now, in FIG. 5, $O_1$ is a projection point of the center axis of the shaft 10, $O_1X$ a projection line of the main line plane in the piece, F a projection point of the center axis of the directing pin 39, G a projection point of the center axis of the eccentric pin 42, $O_2$ a projection point of the center axis of the shaft 46 and a line IIII—IIII' denotes a projection line of the longitudinal center line of the guide groove 57 for the eccentric pin 42. A line III—III' is an intersecting line between the first plane and the plane of the drawing.

Geometrically speaking, there holds good $\angle FO_1X=\theta$ and $\angle FO_2G=2\theta$. Because G lies on the circumference of a circle having a center $O_2$ and a radius K, the length of the projection line of the straight line $O_2G$ on the line III—III' becomes $O_2G \cos 2\theta = K \cos 2\theta$. As the point G in FIG. 5 lies on the line III—III' and has a distance K from $O_2$, the displacement of G in the direction of the line III—III' after rotating by an angle $2\theta$ becomes $$K - K \cos 2\theta = K(1 - \cos 2\theta)$$

Similarly, because the slide frame 34 fixed to the main line pointing piece 41 is displaced equally, the projection point F of the center axis of the directing pin 39 is displaced by a distance $K(1-\cos 2\theta)$ from its position shown in FIG. 4 to that shown in FIG. 5. Hence, the equation $O_1F = r + K(1 - \cos 2\theta)$ holds good. That is, the center axis of the directing pin 39 generates a surface of a contour of the closed curve represented by $$\rho = r + K(1 - \cos 2\theta)$$

along the circumference of the piece 1.

In FIGS. 9, 10 and 11, 1 denotes the piece to be ground which is fixed coaxially with the toothed wheel 9 and whose contour is of the closed curve mentioned above. In FIG. 9 the radius vector OX of this curve lies in the line I—I'.

If the center axis of the directing pin 39 of the slide frame 34 shown in FIG. 4 passes through the osculating point of the piece 1 and the grindstone or tool 24 and the shaft of the latter is arranged on the slide frame in such a manner that the projection point of the center axis of the shaft of the grindstone can move on the line I—I' only, when the grindstone rotates, the piece can be ground accurately only in the places of its circumference corresponding to the shortest and longest lengths of the radius vector of the closed curve. Namely, as mentioned above, when the piece 1 rotates clockwise by an angle $\theta$ the slide frame 34 carrying the grindstone 24 is displaced by a distance $K - K \cos 2\theta$ through the mechanisms mentioned above, so that the circumference of the grindstone should intersect with the circumference of the piece of the contour of the closed curve, as shown in FIG. 10, on the line I—I', with the result that the tangent T—T' to the piece passing through the intersection point on the line I—I' would intersect with the circumference of the grindstone. This means that only by the mechanisms aforementioned the piece of the contour of the closed curve can not be ground accurately.

In order to avoid these defects, according to the invention the tangent indicating mechanism is provided. Namely, as shown in FIG. 11, the center axis of the grindstone is adapted to revolve about the center axis of the directing pin 39 and the grindstone is adapted to osculate with the piece on the line I—I'. Thus, the piece can be ground accurately.

Assuming in FIG. 11 $\rho$ denotes an angle between the line I—I' and the tangent T—T' at the intersecting point of the line I—I' with the closed curve, for the condition that a perpendicular drawn at the intersection point to the tangent T—T' passes through the center of the grindstone circle it suffices that said perpendicular and the line I—I' form an angle $$\left(\frac{\pi}{2} - \rho\right)$$

therebetween.

The essential feature of the present invention resides in provision of a mechanism, whereby the circular movement of the center axis of the grindstone wheel can be performed accurately under the above mentioned conditions.

Concretely speaking, when the shaft 10 in FIG. 1 rotates by an angle $\theta$, all the movable parts of the mechanisms of the grinder move from their positions shown in FIG. 2 to those shown in FIG. 5. The projection point of the center axis of the eccentric pin 48 fixed at a distance 2K from the center axis of the clamping circular disk 7 as shown in FIG. 2 is denoted by B in FIG. 5, in which similarly $O_3$ denotes the projection point of the center axis of the clamping circular disc 7 while A that of the base indicating pin 55. Furthermore, in FIG. 5 the line V—V' denotes the projection line of the longitudinal center line of the guide groove 57 in the circular disc 7, the line VI—VI' that of the base indicating groove 58 and the line VII—VII' the projection line of a place including the center axes of the shaft 60 and the perpendicular indicating pin 49. C denotes the projection point of the center axis of the perpendicular indicating pin 49, ACD the projection line of the longitudinal center line of the directing lever 3, DE that of the steering rod 32 and EF that of the directing base 31. VIII—VIII' denotes the projection line of the common tangent plane including the osculating line of the piece 1 with the grindstone wheel.

When the shaft 10 rotates clockwise from the position in FIG. 2 by an angle $\theta$, the eccentric pin which has been in a position B' (FIG. 5) revolves counter-clockwise on a circle of a radius 2K by an angle $2\theta$ from this position B' to a position B. Because the points A and B lie always on the line VI—VI' which is parallel to the first plane, there holds good the following equation:

$$O_3A = O_3B \sin 2\theta = 2K \sin 2\theta$$

As $O_1O_3CF$ is a rectangle, $$O_3C = O_1F = r + K(1 - \cos 2\theta) = \rho$$

holds good.

Consequently, as the triangle $AO_3C$ is a right-angled one there holds good the following relations:

$$\tan \angle O_3AC = O_3C/O_3A$$

that is $$\tan \angle O_3AC = \rho/2K \sin 2\theta \quad (1)$$

Assuming $\rho$ is an angle between the radius vector $O_1F$ at the point F and the tangent line VIII—VIII', with respect to the equation $\rho = r + K(1 - \cos 2\theta)$ there is an equation reading $$\tan \rho = \rho \bigg/ \frac{2\rho}{2\theta} = \rho/2k \sin 2\theta \quad (2)$$

From the Equations 1 and 2 there is obtained a relation $\rho = \angle O_3AC$ that is the angle $\angle O_3AC$ indicates always an angle $\rho$ between the radius vector $\rho$ and the tangent.

As the straight line ACD is parallel to the straight line EF, the following equations can be obtained:

$$\angle EFO_2 = \angle O_3CA$$
$$\angle EFO_2 + \rho = \angle O_3CA + \rho$$
$$= \angle O_3CA + \angle O_3AC$$
$$= \angle R$$

This means that the straight line EF intersects at the point F perpendicularly with the line VIII—VIII' and that consequently, the center axis of the grindstone wheel lies always in a normal plane including the osculating line passing through the point F. Thus, the tangent indicating mechanism mentioned above can indicate a tangent direction accurately and reliably.

According to this invention working of the circumference of any rotor or the inside circumference of any casing of pumps, flow meters, blowers, etc. which circumference is of a contour of a closed curve represented by $\rho = r + K(1 - \cos 2\theta)$ can be performed very simply and accurately.

From the foregoing it will be seen that many modifications of the specific disclosed form of the invention may be resorted to, and it is to be understood that the scope of the invention is to be ascertained solely by the appended claims.

Having thus described the invention, what is claimed as new and desired to be secured by Letters Patent is:

1. A machine tool of the type described, comprising, in combination, a bed; a first shaft rotatably mounted in said bed; work clamping means secured to said first shaft for rotation of the work about the axis thereof; driving means operable to rotate said first shaft; shaft means, including at least one second shaft rotatably mounted in said bed in spaced parallel relation to said first shaft; driving mechanism operable to rotate said shaft means at an angular velocity of $n$ times that of said first shaft, $n$ being any number; a rotary tool cooperable with the work and rotatable about an axis parallel to that of said first shaft to generate a work circumference at an osculating line between the work and said first shaft; first mounting means mounting said tool on said bed for movement, relative to the work in a plane perpendicular to the axes of rotation of the work and said tool; second mounting means mounting said tool on said first mounting means for oscillatory movement, parallel to the plane of movement of said first mounting means, about a center radially spaced from the tool axis and lying on said osculating line; eccentric means rotatable with said shaft means and connected to said first mounting means to move the latter in such a manner that, at such osculating line of the work and said tool, and in cooperation with the rotation of the work, said tool will generate a circumference of the work in the form of a closed curve having the polar equation of $\rho = r + K(1 \cos n\theta)$, wherein $r$ is the minimum radius of said closed curve, $\rho$ is the radius vector thereof at any given point thereon, $\theta$ is the angle of rotation of said first shaft, and K is the amplitude of the cosine curve; and parallel linkage pivotally mounted on said bed and connected to said eccentric means and said second mounting means, and including said center as one of a pair of spaced fixed pivots, operable to oscillate said second mounting means to maintain the radius of oscillation of said tool constantly perpendicular to the tangent to said osculating line common to the work and said tool.

2. A machine tool, as claimed in claim 1, wherein said shaft means includes a third shaft rotatably mounted in said bed in spaced parallel relation to said first and second shafts; said eccentric means including a first eccentric rotatable with said second shaft and a second eccentric rotatable with said third shaft; a first spur gear fixed to said first shaft; a second spur gear fixed to said second shaft; and a third spur gear fixed to said third shaft; the gear ratio of said first, second and third shafts being $n:1:1$.

3. A machine tool, as claimed in claim 2, in which said first and second shafts lie in a first common plane and the axes of said first and third shafts lie in a second common plane; said common planes intersecting at the axis of said first shaft.

4. A machine tool, as claimed in claim 3, in which said first and second plane intersect at a right angle.

5. A machine tool, as claimed in claim 1, in which said first eccentric is connected to said first mounting means, and said second eccentric is connected to said parallel linkage to oscillate the same about said pair of spaced fixed pivots.

6. A machine tool, as claimed in claim 5, including a circular disc secured to said second shaft; said first eccentric comprising an eccentric pin mounted on said circular disc for sliding movement diametrically thereof; said first mounting means comprising a first slide slidably mounted on said bed for movement along a center line intersecting the axis of said first shaft.

7. A machine tool, as claimed in claim 6, including a second circular disc fixed to said third shaft; said second eccentric comprising an eccentric pin mounted on said second circular disc for slidable movement diametrically thereof; a second slide slidably mounted on said base for movement along a center line intersecting the axis of said first shaft and perpendicular to said first mentioned center line; said second eccentric pin being connected to said second slide; said parallel linkage including an operating extension overlying said second slide and connected to said second eccentric pin.

8. A machine tool, as claimed in claim 5, in which said first mounting means is movable along a center line lying in a first common plane including the axes of said first and second shafts; and a parallel linkage operating element connected to said second eccentric and to said parallel linkage, said second eccentric being movable along a center line in a second common plane including the axes of said first and third shafts.

9. A machine tool, as claimed in claim 5, in which said parallel linkage is mounted on and movable bodily with said first mounting means, and includes a rectilinearly elongated operating element aligned with one arm thereof and formed with a slot extending therealong and receiving said second eccentric.

10. A machine tool, as claimed in claim 9, in which the second of said pair of fixed pivots is at the junction of said operating element and said arm aligned therewith and always lies in a common plane including the axis of said third shaft and parallel to a common plane including the axes of said first and second shafts.

11. A machine tool, as claimed in claim 7, in which the radial spacing of said first eccentric pin from the axis of said first circular disc corresponds to K, and the radial spacing of said second eccentric pin from the axis of said second circular disc corresponds to $n$K.

12. A machine tool, as claimed in claim 6, including a tool supporting post adjustably mounted on said first slide and supporting said tool.

13. A machine tool, as claimed in claim 12, in which said tool post is included in said second mounting means and said center is included in a common plane including said first and second shafts.

14. A machine tool, as claimed in claim 13, including a segmental guide plate disposed between said first slide and said tool post for supporting said tool post during oscillation of the latter; the other of said pair of spaced fixed pivots comprising a pin on said segmental guide plate.

15. A machine tool, as claimed in claim 14, in which said parallel linkage includes an elongated operating arm pivoted intermediate its ends on said last-named pin and having a slot extending along its projecting end and receiving an operating pin coaxial with said second eccentric pin; and a steering arm having one end pivotally connected to the opposite end of said operating arm and its other end pivotally connected to said second mounting means.

16. A machine tool, as claimed in claim 15, in which said second slide is formed on its under surface with a rectilinear groove perpendicular to a common plane including said first and third shafts; said second eccentric pin being engaged with said groove.

17. A machine tool, as claimed in claim 6, including an element mounted on said first slide and adjustable longitudinally thereof, said first eccentric pin being engaged in said element; whereby said tool may be adjusted relative to the work.

18. A machine tool, as claimed in claim 15, in which said parallel linkage is constructed and arranged so that the angle between said tangent and a common plane including the axes of said first and second shaft is always equal to the angle between said operating arm and a common plane including the axes of said first and third shafts.

References Cited in the file of this patent

UNITED STATES PATENTS

| | | |
|---|---|---|
| 1,471,431 | Weaver | Oct. 23, 1923 |
| 2,445,971 | Rosen | July 27, 1948 |